June 6, 1961 R. B. MORRIS 2,986,980
PANORAMIC ADAPTER FOR CAMERAS
Filed Dec. 23, 1957 3 Sheets-Sheet 1

INVENTOR.
ROBERT B. MORRIS
BY
ATTORNEY

INVENTOR.
ROBERT B. MORRIS
BY
ATTORNEY

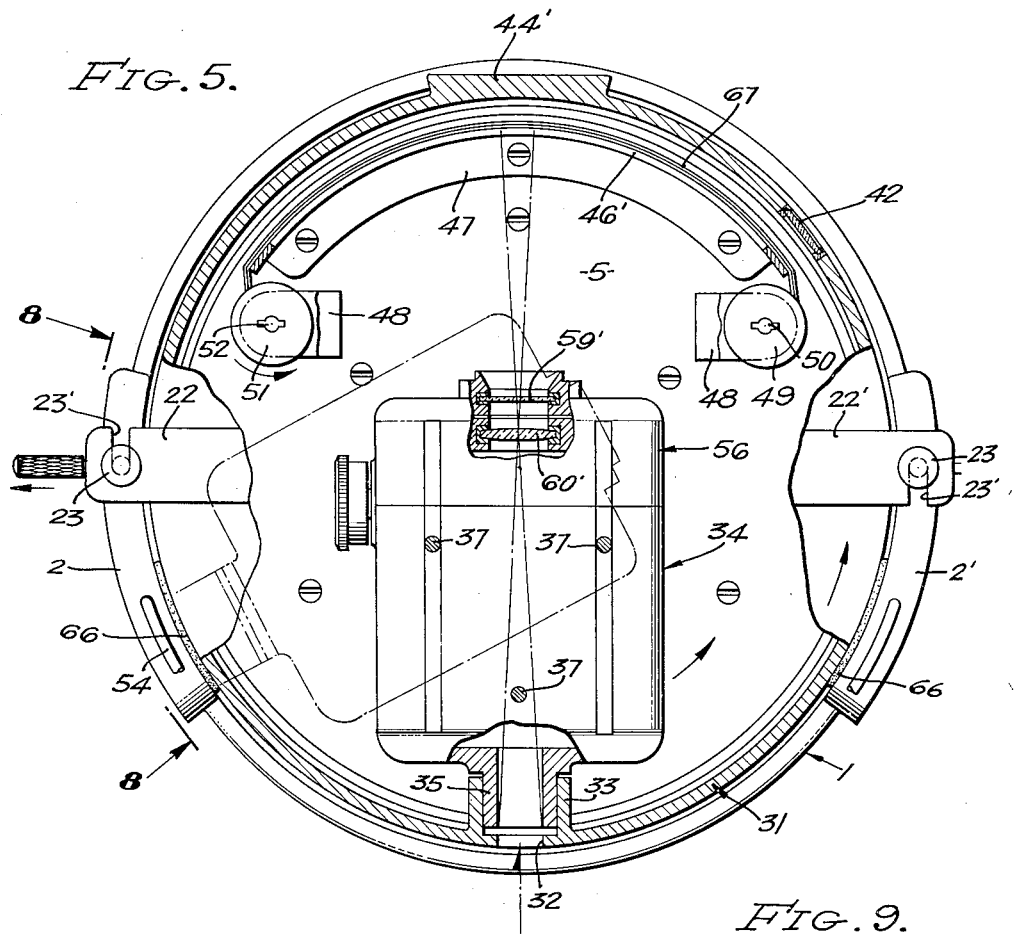
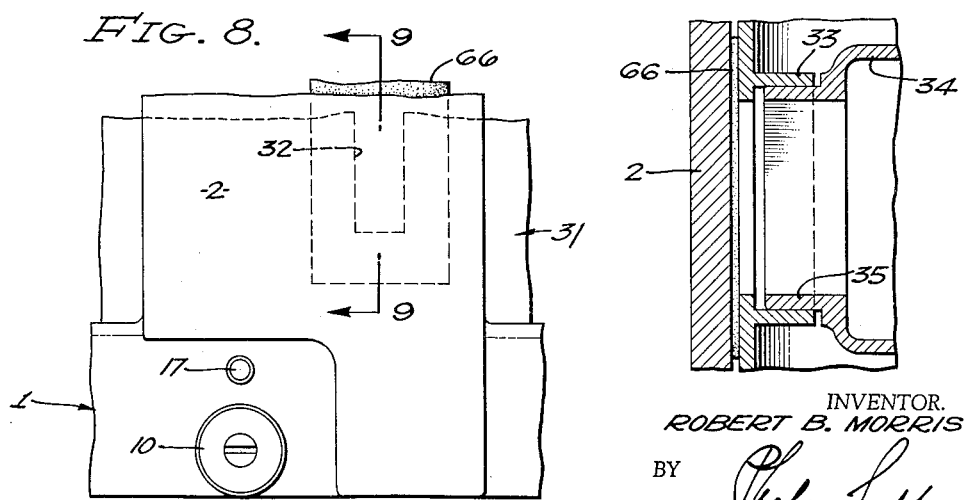

United States Patent Office 2,986,980
Patented June 6, 1961

2,986,980
PANORAMIC ADAPTER FOR CAMERAS
Robert B. Morris, 2028 Broadway, Santa Monica, Calif.
Filed Dec. 23, 1957, Ser. No. 704,427
9 Claims. (Cl. 95—16)

This invention relates to a panoramic adapter for a lens, and has for its purpose the production of photographs with a wider angle of view than is provided by the lens.

As is well known in the photographic art, any lens has a limited angle of view which it will photograph. A practical limit is imposed by the lens on the maximum practical limit of this angle of view available in still cameras operating from fixed positions. Thus, in order to obtain pictures covering an object subtending large angles of view, cameras have been designed in which the lens is moved in an arcuate path over a film strip. Such cameras, known in the art as panoramic cameras, are of considerable complexity and of special design.

In such prior art structures known to applicant, the lens is mounted to rotate about a center, which may be the nodal point of the lens. The lens views the object through a slit of greater width than is included within the angle of view of the lens. The object to be photographed is focused upon an arcuate film positioned in the focal plane of the lens.

I have much simplified this construction by employing a lens which is mounted at a universal focus with respect to the film position and employing a slit of width which approximately subtends the angle of view of the lens. This thus avoids the use of a focusing device for the lens and assures that the object framed by the slot will be in focus on the film after the lens has been adjusted for its nodal point position at the center of rotation of the lens, and that a sharp panoramic image will be obtained.

In accordance with the present invention I employ the lens mounting of a still camera in my panoramic camera. Thus the panoramic camera forms an adapter to a still camera which may be separately employed. The lens, together with the aperture adjusting and timing mechanism of the still camera, may be employed in the still camera and also in the adapter. Thus the photographer with one camera combination can obtain a wider angle of view than is available to him from the still camera.

The above adapter is adaptable to many types of still cameras but is particularly useful when employed as an adapter to box cameras of fixed focus, usually of universal character, i.e., set at infinite focus, and employing simple lenses. Such cameras are usually composed of a camera lens assembly board, spooling mechanism, aperture and time adjustment. This camera lens assembly may be introduced into a box and withdrawn from the box. I employ this combination, by removing the same from the box and inserting the same into the container of the panoramic adapter.

I prefer to mount the camera lens assembly in the adapter, so that the focal plane of the still camera unit, where the film is normally positioned when the unit is used as a still camera, is directed away from the film in the adapter. Thus the lens of the still camera lens assembly is directed towards the film in the adapter and the back of the camera is directed away from the film in the adapter. The light thus passes first through a slit in the panoramic adapter housing and then through the back of the still camera lens assembly, then through the lens to the film in the panoramic adapter, which is arcuately mounted in the adapter housing. The mounting is such that the camera and the lens are rotated on an axis which is concentric with the film arc and on a center which is the nodal point of the lens. I thus obtain a sharp image across the desired arc of the film which may be of the desired angle to give the panoramic view desired.

These and other objects of my invention will be further described in connection with the drawings, of which:

FIG. 5 is a section on line 5—5 of FIG. 4;

FIG. 8 is a fragmentary view taken on line 8—8 of FIG. 5; and

FIG. 9 is a section on line 9—9 of FIG. 8.

Figure 4:
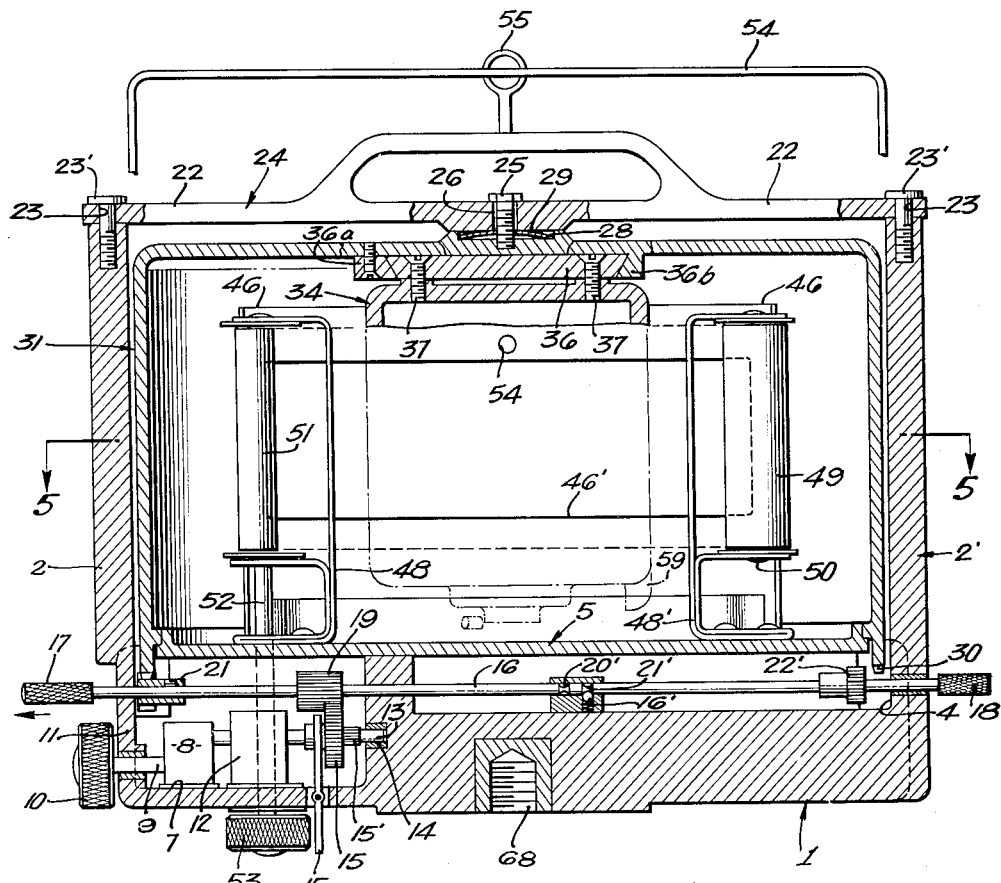
FIG. 4 is a section on line 4—4 of FIG. 3.
Figure 6:
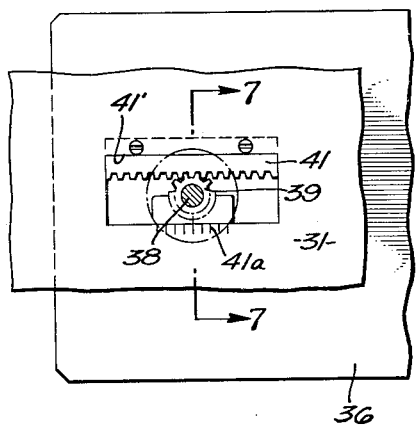
FIG. 6 is a fragmentary view taken on line 6—6 of FIG. 3.

The circular base 1 of the adapter carries two diametrically opposed arcuate plates 2 and 2'. The base carries an annular groove 4 and ribs 6 on which a base plate 5 is mounted by suitable screws. The base is recessed at 7 (see FIG. 4) to provide room for a spring wound motor 8 which drives through a governor 12, a shaft 13 rotatably mounted in a bearing 14 and carries a gear 15 slidably mounted on splines 15' on which it may be slid by means of a fork hinged in a slot in base 1. The motor may be wound by a shaft 9 passing through the wall 11 of the base and carrying a knurled knob 10. The spring wound motor may be of conventional design as may be the governor. The governor may be of any form used with spring motors to give a fixed number of rotations of the shaft per minute irrespective of the tension in spring of the motor 8. Thus, for example, it may be a ball centrifugal governor or any other conventional governor employed with spring wound motors. Many such are known to the spring motor and governor art.

The spur gear 15 drives a wide faced gear 19 mounted on shaft 16 which extends diametrically through the base and terminates in the knobs 17 and 18. At each end of the shaft 16 are mounted gears 21 and 22, whose function will be described below. The shaft is slidably mounted on a bearing carrying a spring pressed ball 16' which may engage the circular detent grooves 20' or 21' in the shaft 16.

Figure 1:
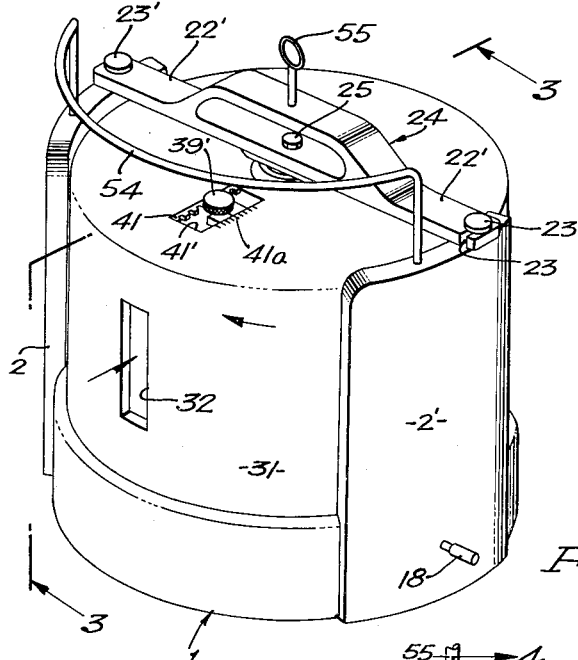
FIG. 1 is a view in perspective of the adapter of my invention.
Figure 3:
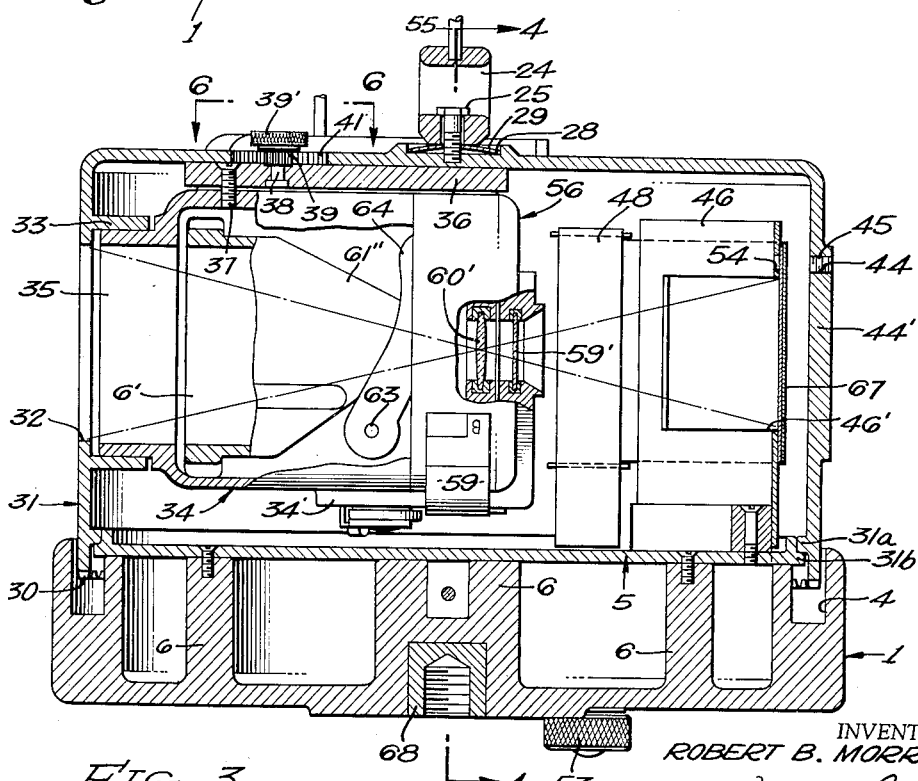
FIG. 3 is a section on line 3—3 of the adapter of FIG. 1.

Mounted on plate 5 are spool brackets 48 on each end of the arcuate film guide 46, apertured at 46' to expose the film. The arcuate foot 47 of the bracket (see FIG. 8) is mounted on the plate 5 by suitable screws. The spools 49 and 51 are rotatably mounted in the brackets 48 and 48' on shafts 50 and 52. Shaft 52 extends through the plate 5 and base 1 and terminates in knurled knob 53 (see FIG. 4). The cylindrical cover 31, carrying a slot 32 and a stop 44', and having a gear tooth lower edge 30 depending into groove 4, is mounted for rotation about the pin 25 (FIG. 3), with the internal shoulder 31a seated on the flange 31b of the plate 5. The pin 25 is screwed into the top of the cover 31 through a bore in the handle 24. The arm extensions 22' carry slots 23 which engage studs 23' (FIGS. 1 and 4) positioned in the top of the arcuate plates 2 and 2'. A cup-shaped spring 29 is placed in the recess 28 underneath the handle 25.

Figure 7:
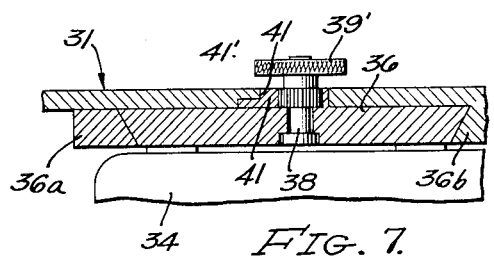
FIG. 7 is a section on line 7—7 of FIG. 6.

The grooved plate 36 (see FIGS. 3, 4 and 7) is slidably positioned in grooved retaining members 36a and 36b and carries the camera lens assembly receptacle 34 by means of screws 37. The camera lens assembly receptacle carries a light tight duct 35 slidably positioned in the light shield 33. The plate 36 carries a vertical shaft 38 on which is mounted a gear 39 and knurled knob 39'. The gear 39 engages a rack 41 positioned in the edge of a slot 41' in the top of the cover 31.

Figure 2:
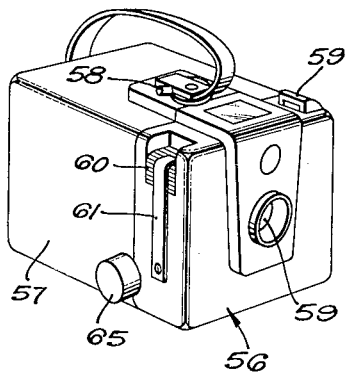
FIG. 2 is one form of a conventional camera with which the adapter of my invention may be employed.

The camera lens assembly 56 may be of any form to fit into the camera lens assembly receiver 34 which is thus also of the form necessary to receive the camera. As illustrated, the camera 56 may be the camera lens assembly portion of a conventional box camera, such as shown in FIG. 2. As shown the camera lens assembly 56 may be removed from the box 57 by releasing the latch 58. It is conventionally composed of a camera lens assembly 56 containing also the timing mechanism actuated by knob 60 which is held down to the full open or time position by means of a spring clip 61 and the aperture adjustment 59 which is positioned in the full open position, i.e., widest aperture. The lens 60' and window 59' are mounted at the front face of the camera which carries the light tight duct 61'' through which the light passes from the lens 60' to the film, which in the camera of FIG. 2 passes from a spool mounted on the spool carrier at 63 over the end 61' of the light duct to the spool mounted at 64, wound by knob 65. With no film in the camera lens assembly, the camera lens assembly 56 is introduced into the receptor 34 and latched in position by the latch 34' mounted on 34. The latch 34' is of the same construction as 58.

To assemble the device, the arm 24 is rotated to remove the slots 23' from the studs 23 and the top 31 is lifted off the case. This exposes the film section. The panoramic camera is then introduced into the cover and slid into the receptor 34 and locked in place. With no film in position on the film spools 51 or 49, the cover is placed on the plate with the shoulder 31a mounted on flange 31b to make a light tight seat. The gear 15 is slid on the spline 15' by means of the fork 15a, out of engagement with the gear 19.

The plug 45 (see FIG. 3) is removed from the thickened portion 44' of the cover 31 exposing a window 44 which may be aligned with an opening 54' in the film guide 46 by rotating the cover by hand. By looking through the window 44 one may see through the opening 54', through the window 59 and lens 60, through the light guide 61', through the light shade 35 and the slot 32 in the cover 31 at a distant object. The knob 39' is rotated back and forth while the cover is rotated back and forth a few degrees. If the nodal point of the lens is not on the center of rotation of the drum a stationary object seen at a distance through the slot 32 will move horizontally across the view. When the nodal point is on center of rotation, the object will appear stationary on rotation of the cover back and forth. The index 41a may be marked at the nodal point position.

The film is then threaded on the spools 49 and 51 with the film passing behind the film guide 46 and over the window 46'. The cover is placed in position and with the gears 15 and 19 disengaged, the cover is rotated until the stop 44' is against one of the plates 2. In this position the slot 32' is against the arcuate felt strips 66 positioned on the interior wall of the plate 2 (see FIGS. 5, 8 and 9), thus forming a light tight cover for the slit 32 and adapter.

The camera is mounted on a tripod or other support by means of the tapped hole 68 and aimed at the object to be photographed, by means of the sights 54 and 55. The motor 8 having been wound by the knob 10, the yoke 15a is moved to engage the gears 15 and 19.

Assume the attitude of the camera to be as shown in the dotted position of FIG. 5 with the stop 44' against the plate 2', the knob 53 is rotated until an index figure on the film 67 appears in view at the window 42 in the case 1, the window being preferably of a red transparent material, as is conventional in still cameras.

The knob 18 is pushed inward so that the rod 16 translates to the left until the ball 16' enters the groove 21' and the gear 21 is in engagement with the circular gear 30 and the gear 22' is disengaged. The drum is thus rotated counter-clockwise as FIG. 5 is viewed, and the slit 32 and the axially aligned camera lens assembly 56 carrying the lens 60' rotates about the nodal point of the lens 60' as a center and across the film 67 which is held on an arc concentric with the nodal point by means of the film guide 46 centered also on the nodal point of the lens 60'.

The film is thus positioned at the focal plane of the lens and the arcuate slit 32 subtends an arc less than the angle of view of the lens, although it may be substantially equal thereto. The motor 8 rotates the cover so that the slit sweeps across the view to be photographed, until the stop 44' comes against the stop 2 whereupon the slit is against the light tight felt strip 66'. In sweeping across the view of the object seen through the slit 32 sweeps across the arcuate film strip, photographing the object in a panoramic view. The rate of movement of the drum is controlled by the governor, and due to the gamma of the film the same speed for practical purposes of amateur photography will require no modification of the rate of movement for different light conditions. However, if desired, a speed adjustment may be provided for the motor 8 and governor 12, as is conventional for such devices, as will be understood by those skilled in the art.

When the film has been exposed, the film may be transported by rotating the knob 53 until another portion of the film is in place as viewed through 42. The knob 17 is pushed in until the ball 16' enters the groove 20' and the gear 22' is engaged with the gear 30 and the gear 21 is disengaged. The drum is now rotated clockwise and the film again exposed.

When the film has been fully exposed, the gears 19 and 15 are disengaged and the arms 22 rotated to disengage the notches and the drum is lifted from the base, and the spool 51 containing the exposed film may then be removed.

While I have described a particular embodiment of my invention for the purpose of illustration, it should be understood that various modifications and adaptations thereof may be made within the spirit of the invention as set forth in the appended claims.

I claim:

1. A panoramic adapter for a camera lens assembly, comprising a base, a substantially cylindrical housing rotatively mounted on said base, a viewing opening in the side wall of said housing, means for rotating said housing to cause said viewing opening to traverse a determined arc about the center of rotation of said housing, an arcuate film holder mounted on said base inside said housing defining an arc about said center of rotation and located substantially diametrically opposite from said arc traversed by said viewing opening, the radial distance of said viewing opening from said center of rotation approximating the radial distance of said film holder from said center of rotation, and means for removably mounting a camera lens assembly in said housing for rotation therewith, with the lens thereof positioned adjacent said center of rotation, one side of said lens facing said viewing opening and the other side thereof facing said film holder, and said lens located at approximately its focal length from said film holder.

2. A panoramic adapter for a camera lens assembly as set forth in claim 1, and further including means for adjustably shifting the position of said camera lens assembly mounting means to enable substantially exact location of the nodal point of said lens in coincidence with said center of rotation, whereby upon mounting a camera lens assembly on the mounting means therefor and positioning a photographic film on said film holder, rotation of said housing to cause said viewing opening to traverse said determined arc a panoramic image is focused over the face of said film.

3. A panoramic adapter for a camera lens assembly as set forth in claim 1, wherein said viewing opening approximately subtends the angle of view of said lens.

4. A panoramic adapter for a camera lens assembly as set forth in claim 3, and further including a window in the side of the housing substantially diametrically opposite from said viewing opening, and means for closing said window for rendering it light tight.

5. A panoramic adapter for a camera lens assembly as set forth in claim 1, and further including in combination therewith a camera lens assembly mounted on said camera lens assembly mounting means, said lens assembly comprising a lens, a lens mounting, an aperture adjusting means, and a timing means.

6. In combination: a panoramic adapter for a camera lens assembly, comprising a base, a substantially cylindrical housing rotatively mounted on said base, a viewing opening in the side wall of said housing, means for rotating said housing to cause said viewing opening to traverse a determined arc about the center of rotation of said housing, an arcuate film holder mounted on said base inside said housing defining an arc about said center of rotation and located substantially diametrically opposite from said arc traversed by said viewing opening, the radial distance of said viewing opening from said center of rotation approximating the radial distance of said film holder from said center of rotation, means for removably mounting a camera lens assembly in said housing for rotation therewith, with the lens thereof positioned adjacent said center of rotation, one side of said lens facing said viewing opening and the other side thereof facing said film holder, and said lens located at approximately its focal length from said film holder, and means for adjustably shifting the position of said camera lens assembly mounting means to enable substantially exact location of the nodal point of said lens in coincidence with said center of rotation; and a camera lens assembly mounted on said camera lens assembly mounting means, said lens assembly comprising a lens, a lens mounting, an aperture adjusting means, and a timing means; whereby on rotation of said housing to cause said opening to traverse said determined arc a panoramic image may be focused over the face of a film carried by said film holder.

7. A panoramic adapter for a camera lens assembly, comprising a base, a substantially cylindrical housing rotatively mounted on said base, a viewing opening in the side wall of said housing, means for rotating said housing to cause said viewing opening to traverse a determined arc about the center of rotation of said housing, an arcuate film holder mounted on said base inside said housing defining an arc about said center of rotation and located substantially diametrically opposite from said arc traversed by said viewing opening, the radial distance of said viewing opening from said center of rotation being at least equal to the radial distance of said film holder from said center of rotation, means for removably mounting a camera lens assembly and associated light duct in said housing for rotation therewith, with the lens thereof positioned adjacent said center of rotation, the end of said light duct positioned adjacent said viewing opening and said lens located at approximately its focal length from said film holder.

8. A panoramic adapter for a camera lens assembly as set forth in claim 7, and further including means for adjustably shifting the position of said camera lens assembly mounting means to enable substantially exact location of the nodal point of said lens in coincidence with said center of rotation, whereby on rotation of said housing to cause said opening to traverse said determined arc, with said lens assembly mounted on the mounting means therefor, a panoramic image may be focused over the face of a film carried by said film holder.

9. A panoramic adapter for a camera lens assembly as set forth in claim 8, and further including in combination therewith a camera lens assembly mounted on said camera lens assembly mounting means, said lens assembly comprising a lens, a lens mounting an aperature adjusting means, and a timing means.

References Cited in the file of this patent
UNITED STATES PATENTS

| | | |
|---|---|---|
| 638,582 | Hopkinson | Dec. 5, 1899 |
| 1,449,295 | Richards | Mar. 20, 1923 |
| 2,324,133 | Burgess | July 13, 1943 |
| 2,764,073 | Liu | Sept. 25, 1956 |
| 2,893,300 | Fajardo | July 7, 1959 |